United States Patent [19]

Hayes et al.

[11] Patent Number: 4,606,249
[45] Date of Patent: Aug. 19, 1986

[54] REAMING TOOL FOR THREADING MACHINES

[75] Inventors: Robert J. Hayes, Westlake; James C. Redman, Amherst, both of Ohio

[73] Assignee: Emerson Electric Co., St. Louis, Mo.

[21] Appl. No.: 696,404

[22] Filed: Jan. 30, 1985

[51] Int. Cl.⁴ .............................................. B23B 27/00
[52] U.S. Cl. ...................................... 82/36 R; 10/90; 408/187
[58] Field of Search ............. 82/36 R, 24 R; 10/89 P, 10/90, 107, 110; 30/108; 408/187, 229, 236

[56] References Cited

U.S. PATENT DOCUMENTS

| 1,673,979 | 6/1928 | Hall ........................................ 10/90 |
| 1,758,973 | 5/1930 | Rasmussen ............................. 10/90 |
| 3,270,592 | 9/1966 | Behnke .................................... 77/73 |
| 4,023,211 | 5/1977 | Miyagawa ............................ 10/96 T |

FOREIGN PATENT DOCUMENTS 2503343  6/1976  Fed. Rep. of Germany .
2837737  3/1980  Fed. Rep. of Germany .
49-8230  2/1974  Japan .

OTHER PUBLICATIONS

Ridge Tool Company, Catalog RT-580, Oct. 1982, pp. 33, 38, 39, 40, 42 and 43.

Primary Examiner—Leonidas Vlachos
Attorney, Agent, or Firm—Body, Vickers & Daniels

[57] ABSTRACT

A reaming tool is mountable on the tooling carriage of a power driven threading machine for continuous motion displacement about two axes and between use and storage positions in which a reaming blade of the tool is respectively coaxial with a tubular workpiece to be reamed and supported laterally outwardly adjacent the tooling carriage. The reaming tool is comprised of an elongate arm carrying the reaming blade, and one end of the arm is mounted on the tooling carriage for pivotal movement of the arm about a first axis laterally offset and parallel to the workpiece axis and a second axis perpendicular to the first axis.

21 Claims, 6 Drawing Figures

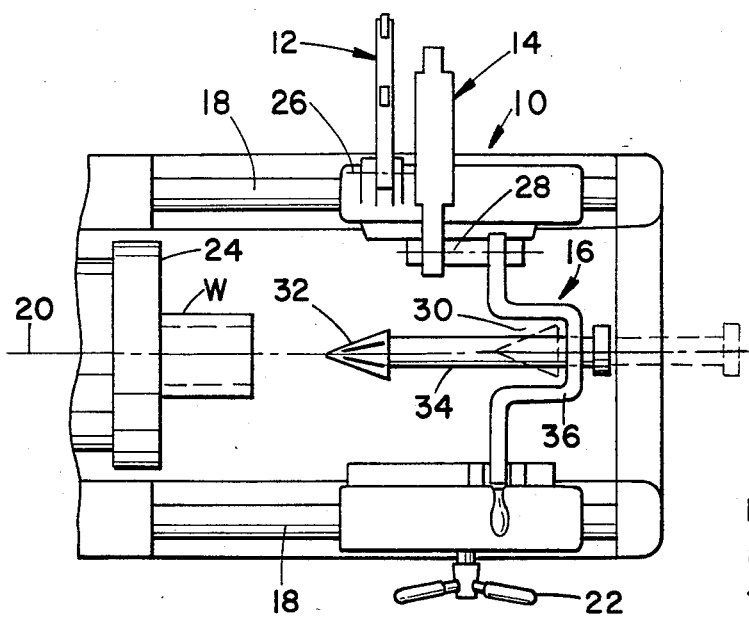
FIG. 1 (PRIOR ART)
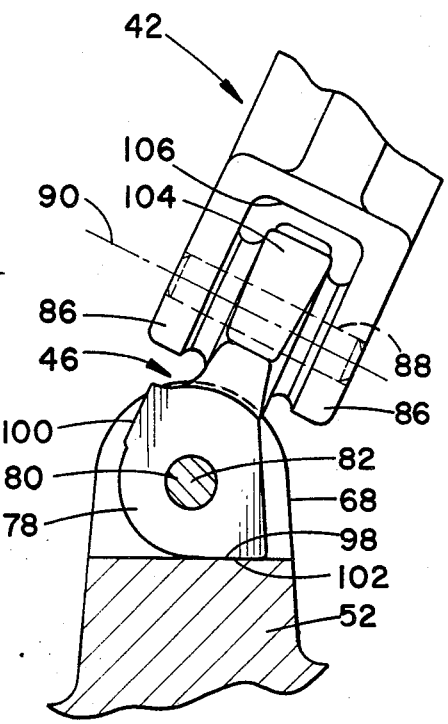
FIG. 4
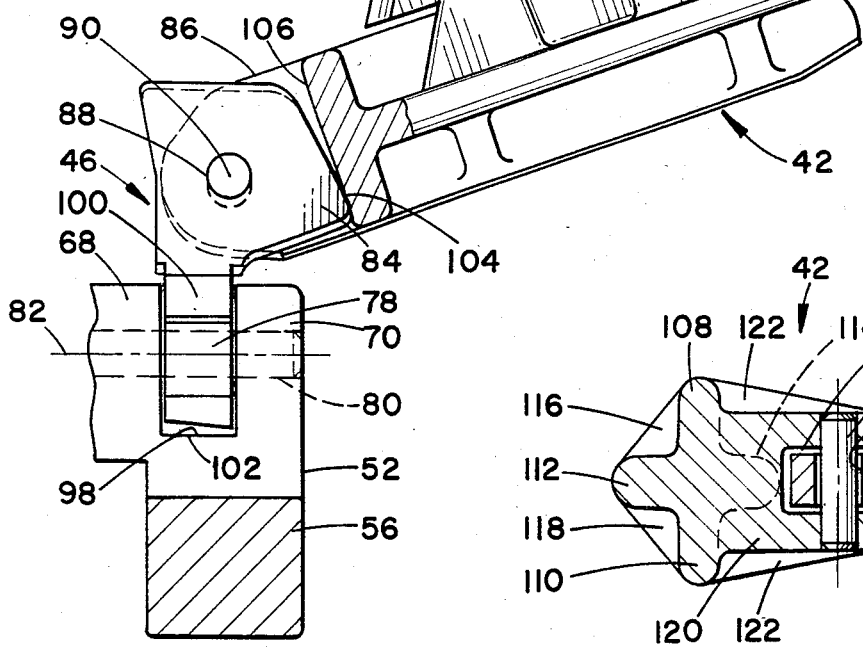
FIG. 5
FIG. 6

4,606,249

REAMING TOOL FOR THREADING MACHINES

BACKGROUND OF THE INVENTION

The present invention relates to the art of power driven threading machines and, more particularly, to an improved reaming tool and tool carriage mounting arrangement therefor.

In connection with power driven threading machines of the type operable to perform workpiece cutting, reaming and threading operations, it is of course well known to support the tools for such operations on a tooling carriage which is supported by carriage rails for axial displacement relative to the workpiece. The tools are sequentially arranged axially of the carriage, and each of the tools is mounted on the carriage for pivotal movement about a corresponding axis which is laterally spaced from and parallel to the machine or workpiece axis, such pivotal support facilitating the displacement of each of the tools between use and storage positions therefor. Each tool in the use position thereof is positionally associated with a workpiece to perfrom the corresponding tool function, and each tool in the storage position thereof is supported laterally outwardly adjacent the tooling carriage in a manner which enables each of the tools to be displaced between its use and storage positions without physical interference with the others.

Reaming tools heretofore provided on the tooling carriage of power driven threading machines are undesirably large, heavy and expensive to manufacture and, most importantly, are cumbersome to manipulate in connection with displacements of the tool between the use and storage positions thereof. More particularly, such reaming tools heretofore provided have included a yoke-like component which, when in the use position, has a central portion offset axially away from a workpiece to be machined. The reaming blade is mounted on one end of a square post which is axially slidably supported by the central portion of the yoke for displacement between a use position in which the remaining blade is disposed forwardly of the yoke towards the workpiece, and a position in which the blade is axially received in the recessed central portion. The yoke is pivotally mounted on one side of the carriage, and the storage position for the reaming tool is that in which the reaming blade is positioned in the yoke recess and the yoke is pivoted to a position laterally outwardly adjacent the carriage. Therefore, and as will become more apparent hereinafter, displacement of the reaming tool between the use and storage positions thereof requires multiple manual manipulations of the component parts which is cumbersome and time consuming. Moreover, the necessity for displacing the reaming blade forwardly of the yoke to achieve reaming of a workpiece results in considerable torsional loading of the stem and yoke, whereby these component parts have to be undesirably large and heavy in order to resist such load forces.

SUMMARY OF THE INVENTION

In accordance with the present invention, a reaming tool structure and mounting arrangement is provided by which the tool is advantageously displaceable between use and storage positions through a single continuous motion and in a manner which eliminates the necessity of manually positioning the reaming blade relative to its support component as a separate operation in connection with such displacement of the tool. Accordingly, the tool is both easier to use and requires less time to manipulate between the use and storage positions thereof. Additionally, the reaming tool structure according to the present invention is axially compact and advantageously enables a reduction in the size and weight of the component parts and thus a savings in the cost of production.

More particularly in accordance with the invention, the reaming tool includes a support arm carrying a reaming blade and having one end mounted on the tooling carriage of a threading machine by a universal-type pivotal connection which provides for the arm to pivot between the use and storage positions of the tool without interference with other tooling on the carriage. Moreover, the universal-type connection advantageously enables the arm to be manipulated in one continuous motion between the use and storage positions of the tool, thus to facilitate the positioning operations and to minimize the time and energy required in connection therewith. Furthermore, such a universal-type mounting advantageously enables the blade supporting arm to be substantially linear and for the blade to be directly mounted thereon, thus minimizing the space occupied by the tool both in its use and storage positions and, by direct mounting of the blade on the arm, to enable loads on the tool during a reaming operation to be resisted more efficiently than heretofore possible.

It is accordingly an outstanding object of the present invention to provide an improved reaming tool and an improved arrangement for mounting a reaming tool on the carriage of a power driven threading machine.

Another object is the provision of a reaming tool of the foregoing character mountable on a threading machine carriage for continuous motion displacement about plural axes between use and storage positions relative to the carriage.

A further object is the provision of a reaming tool and mounting arrangement of the foregoing character which is more compact and less expensive to produce than reaming tools heretofore available and which additionally is more easily and quickly manipulable between the use and storage positions thereof.

Still another object is the provision of a reaming tool for a power driven threading machine comprising a generally linear arm mounted on the tool carriage for continuous motion displacement about plural axes to facilitate manual displacements of the tool between use and storage positions thereof and without interference with adjacent tools on the carriage.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIG. 1 is a plan view of a prior art reaming tool and mounting arrangement:

FIG. 4 is a detail elevation view, partially in section, looking in the direction of line 4—4 in FIG. 2 and showing the mounting block of the reaming tool in the storage position thereof:

FIG. 5 is a detail elevation view, partially in section, looking in the direction of line 5—5 in FIG. 3, and illustrating the mounting block and arm of the reaming tool in the storage position; and, FIG. 6 is a cross-sectional elevation view through the arm and reaming blade taken along line 6—6 in FIG. 2.

DESCRIPTION OF THE PREFERRED EMBODIMENT

Figure 2:
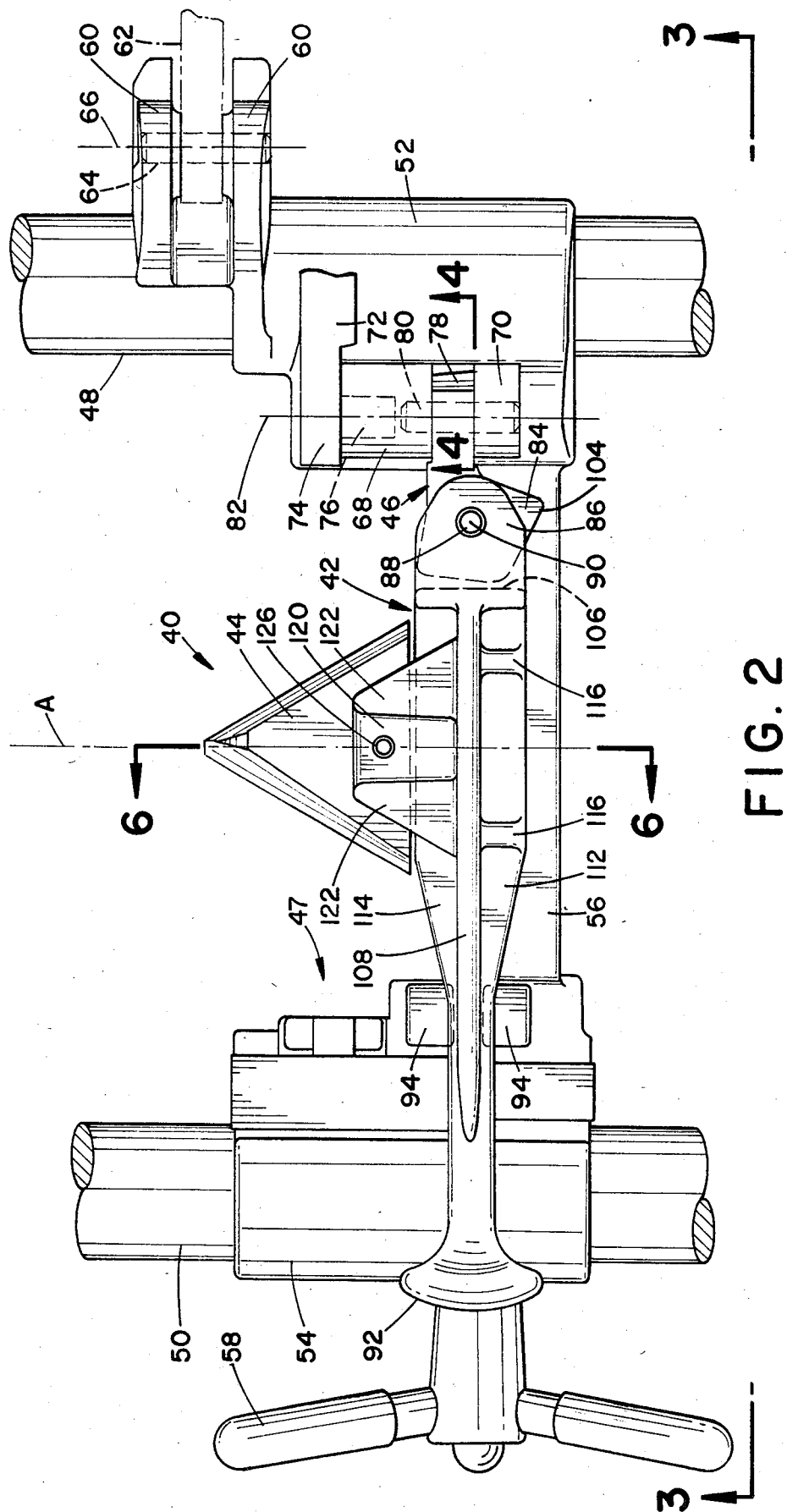
FIG. 2 is a plan view of a reaming tool and carriage mounting arrangement according to the present invention and showing the reaming tool in its use position.

Referring now in greater detail to the drawings wherein the showings are for the purpose of illustrating a preferred embodiment of the invention only and not for the purpose of limiting the invention, FIG. 1 illustrates a prior art reaming tool and mounting arrangement in conjunction with the tooling carriage of a power driven threading machine. More particularly, as somewhat schematically shown in FIG. 1, a threading machine tooling carriage 10 is provided with a workpiece cutting tool 12 and a threading tool 14, which are shown in storage positions relative to the carriage, and a reaming tool 16 which is shown in its use position. As is well known, carriage 10 is mounted on a pair of support rails 18 which are laterally spaced from and parallel to the machine or workpiece axis 20, and the carriage is displaceable in axially opposite directions along rails 18 by turning an operating handle 22 to drive a pinion which engages rack teeth on the underside of the corresponding rail 18. As is further well known, a workpiece W to be machined is supported coaxially with axis 20 by means of a chuck 24 which is driven to rotate the workpiece during the machining operations.

Cutting tool 12 is mounted on carriage 10 for pivotal displacement in opposite directions about an axis 26 and between the storage position shown and a use position in which the tool extends laterally across axis 20, and threading die head 14 and reaming tool 16 are mounted on the carriage for independent pivotal movement about a common pivot axis 28 for the same purpose. It will be appreciated of course that only one machine operation takes place at a time and that during one machining operation the other tools are disposed in the storage positions thereof. It will likewise be appreciated that displacement of the several tools between the storage and use positions thereof must be achieved without physical interference between the tools. This requirement has heretofore necessitated the use of a reaming tool construction in which the reaming tool arm has a contour between its opposite ends which provides a generally U-shaped recess 30 coaxial with and facing workpiece W. The arm carries a reamer blade 32 mounted on a square post 34 which is axially slidably supported at the inner end of recess 30 by bridging portion 36 of the arm. In the use position of the reaming tool, reamer blade 32 is in the solid line position shown in FIG. 1, and the blade is displaced to the broken line position shown therefor when the tool is to be displaced to its storage position. It will be appreciated that such positioning of blade 32 in recess 30 is necessary to prevent physical interference between the reaming tool and tools 12 and 14 during pivotal displacement of the tools about axes 26 and 28. Mounting of the reamer blade 32 on the arm in the foregoing manner necessitates the provision of a releaseable holding mechanism to maintain the reamer blade in its outermost position during a reaming operation, and it will be appreciated therefore that each displacement of the tool between its use and storage positions requires two separate manual manipulations of the component parts of the tool, namely displacement of reamer blade 32 between its extended and retracted positions, and the pivotal displacement of the tool arm about axis 28. Additionally, the distance between reamer blade 32 and bridging portion 36 of the arm when the tool is in the use position results in considerable torque loading of the latter during a reaming operation, and this undesirably requires that post 34 and the tool arm be large and heavy in order to have sufficient strength to resist such loading.

Referring now to FIGS. 2-6 of the drawing, a reaming tool 40 according to the present invention is comprised of a generally linear arm 42 having a reamer blade 44 mounted thereon as described hereinafter, and a mounting block 46 by which the arm is mountable on a threading machine carriage 47 for pivotal displacement about two angularly related axes. Carriage 47 is axially slidably supported on carriage rails 48 and 50 on laterally opposite sides of threading machine axis A and, in this respect, is comprised of side portions 52 and 54 slidably received on rails 48 and 50, respectively, and a cross member 56 which is integral with and laterally interconnects the side portions. Axial displacement of the carriage along rails 48 and 50 is achieved by means of a rotatable operating handle 58 which, while not shown, operates to rotate a pinion supported in side portion 54 and engaging rack teeth on the underside of rail 50. Side portion 52 of the carriage includes integral upstanding and axially spaced apart mounting lugs 60 by which a workpiece cutting tool 62, only partially shown, is mounted by means of a pin 64 for pivotal displacement about pin axis 66 between storage and use positions, the former being depicted in the drawings. Side portion 52 is further provided with upstanding mounting lugs 68 and 70 by which reaming tool 40 and a threading die head 72, the latter only partially shown, are pivotally mounted on the carriage. More particularly, die head 72 has a mounting end 74 including a pivot pin 76 received in mounting lug 68, and mounting block 46 has an apertured end 78 between lugs 68 and 70 and pivotally interconnected therewith by a pivot pin 80 which is coaxial with pin 76. Accordingly, tools 40 and 72 are supported for independent pivotal displacement between corresponding storage and use positions about a common axis 82 which is parallel to machine axis A. It will be appreciated of course that in FIGS. 2 and 3 reaming tool 40 is shown in the use position thereof and threading die head 72 and cutter 62 are shown in the storage positions thereof.

Mounting block 46 has an arm mounting end 84, and the corresponding end of arm 42 is recessed to provide legs 86 receiving end 84 of the mounting block therebetween. A pin 88 extends through openings in legs 86 and end 84 and pivotally interconnects arm 42 with mounting block 46 for pivotal displacement in opposite directions about axis 90 of pin 88 which, in the embodiment illustrated, is perpendicular to pin axis 82. As will be appreciated from FIGS. 2 and 3, arm 42 extends generally linearly across machine axis A when tool 40 is in its use position, and the end of arm 42 opposite the end pivotally interconnected with side portion 52 of the carriage is provided with a handle 92 to facilitate manipulation of the tool between its use and storage positions. Further, side portion 54 of the carriage is provided with a pair of upstanding lugs 94, and the underside of arm 42 is provided with a locating rib 96 received between lugs 94 when the tool is in its use position to axially and vertically stabilize the tool. For the purposes which will become apparent hereinafter, the portion of side 52 of the carriage between mounting lugs 68 and 70 is provided with a stop surface 98, carriage mounting portion 78 of mounting block 46 is provided with linear stop surfaces 100 and 102, arm mounting end 84 of mounting block 46 is provided with a stop surface 104, and the inner end of the recess in arm 42 between legs 86 is provided with a stop surface 106. As will be appreciated from FIG. 3, stop surface 100 engages surface 98 of the carriage when the reaming tool is in its use position and thus cooperates with locating rib 96 on the other end of arm 42 to vertically stabilize the arm.

Figure 3:
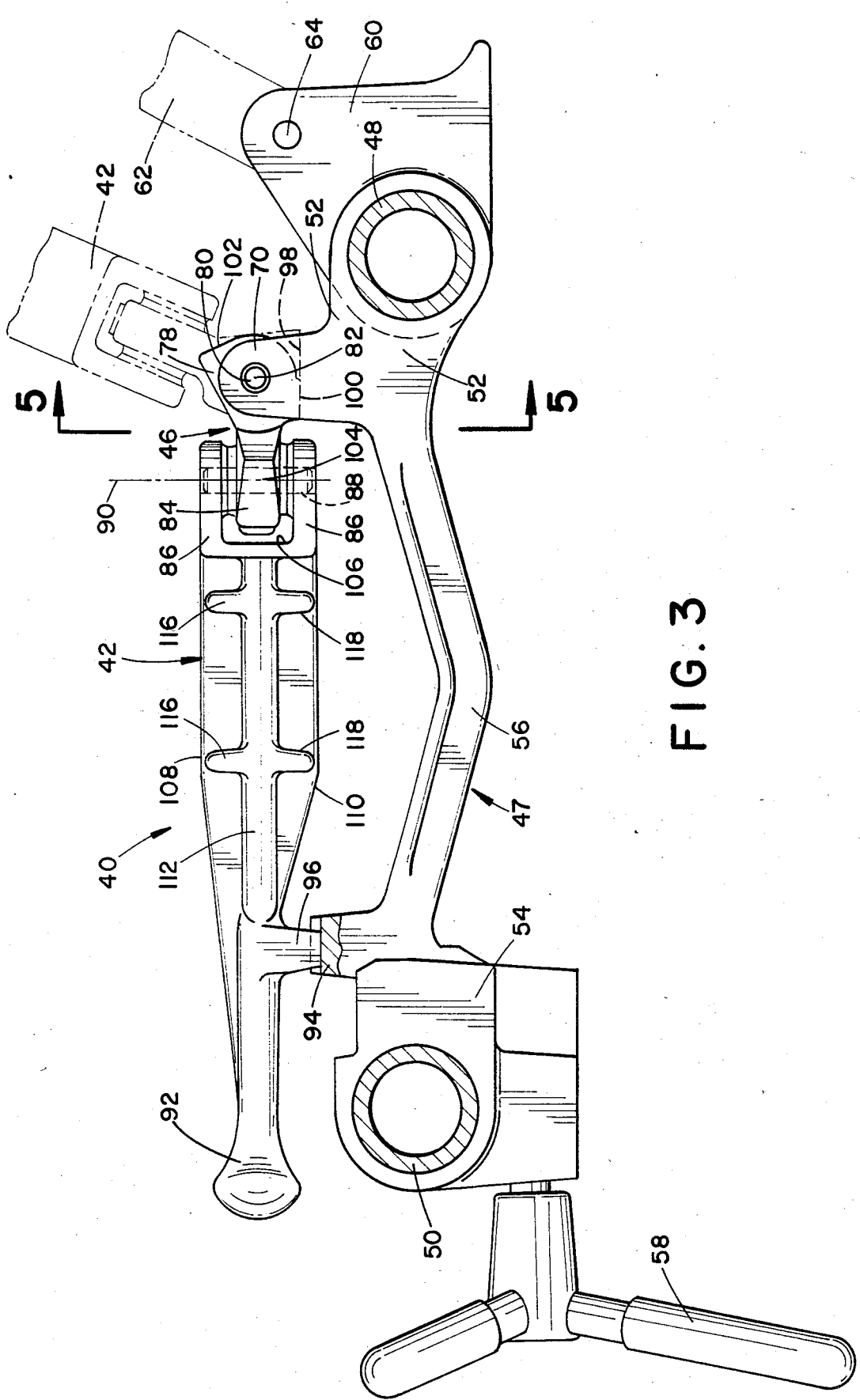
FIG. 3 is an end elevation view of the reaming tool and mounting arrangement as seen along line 3—3 in FIG. 2.

As will be appreciated from FIG. 2, reamer blade 44 extends axially forwardly of arm 42 to the extent that displacement of arm 42 about pin axis 82 and clockwise from the position shown in FIG. 3 would position cutter blade 44 to engage tools 62 and 74 in the storage positions of the latter tools and/or would preclude displacement of the latter tools to the use positions thereof without physical interference with the reaming tool. In accordance with the present invention, and as will be best appreciated from the following description of FIGS. 2-5, the mounting of arm 42 on the carriage for pivotal movement about two angularly related axes advantageously enables displacing the reaming tool to a storage position in which the other tools are free to be pivotally displaced to the use positions thereof without interference with the reaming tool. Furthermore, displacement of the reaming tool to and from the storage position is achieved by a single, continuous pivotal movement or motion of the tool. With respect to displacement of the reaming tool from its use to its storage position, for example, arm 42 is first pivoted clockwise about pin axis 82 to disengage locating rib 96 from between lugs 94, and then the handle is either simultaneously or sequentially pivoted clockwise about pin axis 82 and counterclockwise about pin axis 90, such pivotal movements being with reference to FIGS. 3 and 2 of the drawing, respectively. Pivotal movement of arm 42 about pin axis 82 ultimately positions mounting block 46 in the position shown in FIG. 4 in which stop surfaces 98 and 102 interengage to limit pivotal displacement of mounting block 46 in the direction toward the storage position of arm 42. In such position of mounting block 46 it will be appreciated that arm 42 is inclined laterally outwardly relative to the corresponding side of carriage portion 52. Pivotal movement of arm 42 about pin axis 90 ultimately positions arm 42 relative to mounting block 46 as shown in FIG. 5 and in which stop surfaces 104 and 106 interengage to limit pivotal displacement of arm 42 about pin axis 90 in the direction of tool storage. It will be appreciated from the foregoing description in connection with FIGS. 2-5, and especially from the positions of the component parts illustrated in FIGS. 4 and 5, that arm 42 of the reaming tool in the storage position of the latter is laterally offset from the machine axis A and is laterally outwardly and axially inclined relative to vertical and to the machine axis and pivot pin axis 82.

As mentioned hereinabove, arm 42 is generally linear between its opposite ends. While the structural configuration of the arm can be changed from that shown in the drawings without affecting the desired mounting arrangement described hereinabove, the disclosed structure for the arm advantageously promotes minimizing the size of the arm and the amount of material required therefor while providing the necessary stiffness for resisting the torsion and deflection forces applied thereto during a reaming operation. Moreover, the preferred structure enables handling the latter work loads more efficiently than reaming tools heretofore provided. More particularly with regard to the preferred structure, and as best seen in FIGS. 2, 3 and 6 of the drawing, arm 42 is cast, preferably from iron, and in cross-section between the mounting end thereof and positioning lugs 96 and with respect to the orientation of the arm shown in FIGS. 2 and 3 is comprised of laterally extending vertical ribs 108 and 110 and horizontal ribs 112 and 114, laterally spaced apart webs 116 between ribs 108 and 112 and laterally spaced apart webs 118 between ribs 110 and 112. Further, a horizontally extending reamer blade mounting column 120 is provided on the arm and has a vertical thickness greater than that of rib 114 and is bounded on its laterally opposite sides by web portions 122 merging with rib 108 on the upper side of the arm and with rib 110 on the lower side thereof. Mounting column 120 is provided with a recess 124, and reamer blade 44 is floatingly mounted in recess 124 by means of a shoulder bolt 126. More particularly, blade 44 is provided with an opening 128 slightly larger in diameter than bolt 126, and clearance is provided between the opposite sides and inner end of blade 44 and the corresponding surface of recess 124 to provide limited relative displacement of blade 44 relative to boly 126. It will be apreciated that blade 44 has an axis, not designated numerically, which in the use position of the tool as seen in FIG. 2 generally coincides with machine axis A and thus the axis of a workpiece to be reamed. The floating mount for blade 44 advantageously provides for the blade to be self-centering upon engagement of the blade with a workpiece, thus to compensate for workpiece and machine inaccuracies. Furthermore, it will be appreciated that the mounting of the reamer blade directly on the arm and relatively close to the longitudinal axis thereof provides for the efficient handling of torsion and deflection loads imposed thereon during a reaming operation.

While considerable emphasis has been placed herein on the specific structure and structural interrelationship between the component parts of the preferred embodiment of the reamer tool, it will be appreciated that other embodiments can be made and that changes can be made in the preferred embodiment without departing from the principles of the present invention. In particular, it will be appreciated that universal joint arrangements other than that illustrated and described herein can be provided for mounting the arm of the reaming tool on a carriage for pivotal movement about plural, angularly related axes so as to enable a single, continuous motion displacement of the reaming tool between its use and storage positions, and to provide a storage position in which the arm and reamer blade thereon are located laterally outwardly of the carriage and out of the path of movement of other tools on the carriage from their storage to their use positions. For example, while not as economically practical as the preferred embodiment, a ball and socket type connection for the reamer tool arm would facilitate such displacement and storage capabilities for the tool. Accordingly, it is to be distinctly understood that the foregoing descriptive matter is to be interpreted merely as illustrative of the present invention, and not as a limitation.

Having thus described the invention, it is claimed:

1. A reaming tool independently mountable on tool carriage means of a threading machine having a horizontal axis, said tool comprising arm means having opposite ends, reamer blade means on said arm means between said opposite ends, and means on one of said opposite ends of said arm means for mounting said arm means on said carriage means for independent pivotal movement relative thereto about angularly related plural axes at said one end of said arm means and between use and storage positions, said arm means in said use position extending horizontally across said threading machine axis and in said storage position being laterally offset from said axis and axially inclined relative to vertical.

2. A reaming tool according to claim 1, wherein said means on said one of said opposite ends of said arm means includes mounting block means mountable on said carriage means for pivotal movement about a first axis.

3. A reaming tool according to claim 2, wherein said first axis is parallel to said threading machine axis.

4. A reaming tool according to claim 2, wherein said arm means is interconnected with said mounting block means for pivotal movement relative thereto about a second axis.

5. A reaming tool according to claim 4, wherein said first and second axes are perpendicular to one another.

6. A reaming tool according to claim 5, wherein said first axis is parallel to said threading machine axis.

7. A reaming tool according to claim 5, wherein said second axis is perpendicular to said threading machine axis.

8. A reaming tool according to claim 4, wherein said mounting block means and carriage means interengage to limit pivotal movement of said mounting block means about said first axis when said arm means is in said storage position.

9. A reaming tool according to claim 8, wherein said arm means and mounting block means interengage to limit pivotal movement of said arm means about said second axis when said arm means is in said storage position.

10. A reaming tool according to claim 9, wherein said first and second axes are perpendicular to one another.

11. A reaming tool according to claim 10, wherein said first axis is parallel to said threading machine axis.

12. A reaming tool according to claim 1, wherein said reamer blade means has a blade axis coinciding with said machine axis when said arm means is in said use position and said blade means is mounted on said arm means for limited pivotal displacement of said blade axis relative to said machine axis.

13. A reaming tool mountable on tool carriage means of a threading machine having an axis, said tool comprising mounting block means mountable on said carriage means for pivotal movement about a first axis laterally offset and parallel to said threading machine axis, arm means having an end interconnected with said mounting block means for pivotal movement relative thereto about a second axis perpendicular to said first axis, reamer blade means on said arm means and spaced from said end thereof, said arm means being pivotal in opposite directions about said first and second axes between use and storage positions, said arm means in said use position extending laterally from said first axis across said threading machine axis, and said arm means in said storage position being inclined relative to vertical and laterally outwardly and axially with respect to said first axis.

14. A reaming tool according to claim 13, wherein said mounting block means and carriage means include means interengaging to limit pivotal movement of said arm means about said first axis in the direction from said use toward said storage position.

15. A reaming tool according to claim 14, wherein said interengaging means is a stop surface on each said mounting block means and said carriage means.

16. A reaming tool according to claim 13, wherein said arm means and mounting block means include means interengaging to limit pivotal movement of said arm means about said second axis in the direction from said use toward said storage position.

17. A reaming tool according to claim 16, wherein said interengaging means on said arm means and mounting block means is shoulder means on said mounting block means and a stop surface on said arm means.

18. A reaming tool according to claim 16, wherein said mounting block means and carriage means include means interengaging to limit pivotal movement of said arm means about said first axis in the direction from said use toward said storage position.

19. A reaming tool according to claim 18, wherein said interengaging means between said mounting block means and said carriage means is a stop surface on each said mounting block means and carriage means, and said interengaging means between said arm means and mounting block means is shoulder means on said mounting block means and a stop surface on said arm means.

20. A reaming tool according to claim 18, wherein said reamer blade means has a blade axis coinciding with said machine axis when said arm means is in said use position and said blade means is mounted on said arm means for limited pivotal displacement of said blade axis relative to said machine axis.

21. A reaming tool according to claim 13, wherein said reamer blade means has a blade axis coinciding with said machine axis when said arm means is in said use position and said blade means is mounted on said arm means for limited pivotal displacement of said blade axis relative to said machine axis.

* * * * *